United States Patent [19]

Yetter

[11] E Re. 28,737

[45] Reissued Mar. 16, 1976

[54] PROCESS FOR SYNTHESIZING SPECIFIC COMPLETE MIXED POLYOL ESTERS

[75] Inventor: Jerry Joseph Yetter, Cincinnati, Ohio

[73] Assignee: The Procter & Gamble Company, Cincinnati, Ohio

[22] Filed: Oct. 31, 1974

[21] Appl. No.: 519,499

Related U.S. Patent Documents

Reissue of:

[64] Patent No.: 3,809,711
Issued: May 7, 1974
Appl. No.: 242,139
Filed: Apr. 7, 1972

[52] U.S. Cl. ..... 260/410.7; 260/404.8; 260/410.6; 260/469; 260/476 R; 260/491

[51] Int. Cl.[2] ..... C11C 3/02

[58] Field of Search ..... 260/410.6, 410.7, 404.8, 260/488 J, 491

[56] References Cited

UNITED STATES PATENTS

| | | | |
|---|---|---|---|
| 2,307,047 | 1/1943 | Katzman et al. | 252/354 |
| 2,975,152 | 3/1961 | Hurwitz et al. | 260/31.6 |
| 3,056,818 | 10/1962 | Werber | 260/410.6 |
| 3,410,881 | 11/1968 | Martin et al. | 260/404.8 |

OTHER PUBLICATIONS

Gramstead et al.: J. Chem. Soc., pp. 4069–4079 (1957).

Mattson et al.: J. Lipid Research, vol. 5, No. 3, pp. 374–377 (1964).

*Primary Examiner*—Patrick P. Garvin
*Assistant Examiner*—John F. Niebling
*Attorney, Agent, or Firm*—Jerry J. Yetter; Richard C. Witte; Julius P. Filcik

[57] ABSTRACT

Reacting a partial polyol monocarboxylic acid ester with an acidic anhydride in the presence of a perfluoroalkyl sulfonic acid catalyst to produce specific complete mixed polyol esters, especially synthetic cocoa butter, with substantially no ester group rearrangement.

20 Claims, No Drawings

PROCESS FOR SYNTHESIZING SPECIFIC COMPLETE MIXED POLYOL ESTERS

Matter enclosed in heavy brackets [ ] appears in the original patent but forms no part of this reissue specification; matter printed in italics indicates the additions made by reissue.

BACKGROUND OF THE INVENTION

This invention relates to a process for synthesizing complete mixed polyol esters, that is, polyol esters having at least two different ester groups and no hydroxyl groups. More particularly, this invention relates to a process for esterifying partial polyol esters without rearrangement of ester groups either by intermolecular or intramolecular acyl group exchange. The term "partial polyol ester" is used herein to denote a polyol which is partially, that is, incompletely esterified and as a consequence contains at least one hydroxyl group.

In general, this process provides mixed polyol esters with specific ester groups at specific polyol hydroxyl sites. Thus, this process is especially useful for providing synthetic cocoa butter and closely related oleaginous substitutes from inexpensive raw materials such as lard and palm oil.

Cocoa butter is unusual among naturally occurring fats in that it is normally a brittle solid up to 77° F., has a relatively narrow melting range and is almost completely liquid at 95° F., or slightly below body temperature. These unique melting characteristics make cocoa butter suitable for use in confectionery products, especially chocolates. Such melting characteristics contribute glossy coatings, absence of stickiness and favorable volume changes during confectionery product molding.

Because of these advantageous melting characteristics and because of the demand for the properties which cocoa butter imparts to confectionery products, large quantities of this expensive commodity are imported even when domestic fats which can be used to produce synthetic cocoa butter are in plentiful supply at much less than the cost of cocoa butter. For many years, therefore, attempts have been made to provide from readily available and cheaper fats a product that can be used to replace at least part of the cocoa butter in chocolates and other confectionery products that normally contain cocoa butter.

In this search for a synthetic cocoa butter, it has been determined that its advantageous physical characteristics are derived from the arrangement of the fatty acid substituents in its glycerides. Analytical tests have shown that cocoa butter comprises principally 1-palmitoyl-2-oleoyl-3-stearoyl glycerol, and minor amounts of triglycerides having a different order of substitution of the palmitoyl, oleoyl and stearoyl groups on the glycerol molecule. Accordingly, 1-palmitoyl-2-oleoyl-3-stearoyl glycerol would provide the desired cocoa butter substitute, were this compound readily available.

With most esterification procedures, the synthesis of such substantially pure specific triglycerides is impossible since substantial ester group rearrangement occurs during esterification of specific partial glycerides, namely, mono- and diglycerides, the synthesis of which is known in the prior art. Thus, acylation of 1,3-diglycerides with oleic acid and a conventional acid esterification catalyst provides only a minor proportion of triglycerides having an oleoyl group at the 2-position, where this group must necessarily occur to provide the desired synthetic cocoa butter.

Feuge, Willich and Guice, the Journal of the American Oil Chemists Society, July 1963, pp. 260–264, demonstrate that ester group rearrangement ordinarily occurs during the esterification of partial glycerides, and, at page 260, point out that hydrochloric, sulfuric and hydrocarbyl sulfonic acids, which are widely used as esterification catalysts, cause ester group rearrangement. Accordingly, these acid catalysts are not suitable for preparing the desired position-specific (i.e., 2-oleoyl) triglycerides for use as a cocoa butter substitute. Similarly, ester group rearrangement ordinarily occurs during esterification of partial polyol esters other than glycerides, e.g., during esterification of partial 1,2-propylene glycol esters.

One known method for synthesizing a cocoa butter substitute comprises reacting a diglyceride having palmitoyl and stearoyl groups at the 1- and 3-positions with oleoyl chloride; see U.S. Pat. 3,012,890. Furthermore, it is known in the prior art that, in general, acid chlorides can be used to specifically esterify mono- and diglycerides. The use of acid chlorides for specific esterifications has many undesirable aspects, however. For instance, acid chlorides are very corrosive and their use involves handling problems. Besides, hydrochloric acid, a by-product of the reaction of an acid chloride with a hydroxyl group, is difficult to remove from the oleaginous reaction product, a critical factor inasmuch as the product is to be used as a food.

U.S. Pats. 3,410,881 and 3,337,596 disclose the use of perchloric acid as an effective catalyst for preparing a cocoa butter substitute without rearrangement of the ester groups. However, perchloric acid is known to be explosive and its use in the presence of organic compounds is preferably avoided.

It has now been found that perfluoroalkyl sulfonic acids catalyze the esterification of partial polyol esters without ester group rearrangement. Gramstad et al., J. Chem. Soc., 4069, 1957, teach the use of trifluoromethane sulfonic acid as an esterification catalyst but do not suggest that it would be useful in the preparation of triglycerides without ester rearrangement. Moreover, the previously noted Feuge et al., article suggests that sulfonic acid esterification catalysts per se cause group rearrangement.

It is therefore an object of this invention to provide an improved process for synthesizing specific complete mixed polyol esters, especially specific mixed triglycerides. It is a further object to provide a process for synthesizing specific complete mixed polyol esters with substantially no rearrangement of ester groups either by intermolecular or intramolecular exchange. It is a further object herein to provide a process for synthesizing specific complete mixed polyol esters without using perchloric acid or acid chlorides. Yet another object of this invention is to provide a process for the preparation of synthetic cocoa butter. These and other objects are obtained herein as will be seen from the following disclosure.

SUMMARY OF THE INVENTION

According to this invention, it has been found that specific complete mixed polyol esters, i.e., those with specific ester groups at specific polyol hydroxyl sites, can be prepared by esterifying partial polyol esters with acid anhydrides in the presence of a catalytic amount of a perfluoroalkyl sulfonic acid or perfluoroalkyl sulfonic acid anhydride at temperatures from about −30° F. to about 350° F.

DETAILED DESCRIPTION OF THE INVENTION

The perfluoroalkyl sulfonic acids used herein as the catalyst in the position-specific esterification process are those materials more fully described in U.S. Pat. 2,732,398, incorporated herein by reference. In general terms, these acids can be regarded as derivatives of sulfuric acid wherein one of the two hydroxyl groups has been replaced by a fluorocarbon group. These perfluoroalkyl sulfonic acids have the generic structural formula $R_fSO_3H$, wherein $R_f$ is the recognized abbreviation for the perfluoroalkyl group. The term "perfluoroalkyl" as used herein has the usual connotation of a hydrocarbly moiety wherein every hydrogen atom is replaced by a fluorine atom. Also useful as the catalyst herein are the perfluoroalkyl sulfonic acid anhydrides of the formula $(R_fSO_2)_2O$ formed by the condensation of two moles of the aforementioned perfluoroalkyl sulfonic acids. $R_f$ herein represents perfluoroalkyl substituents having from 1 to about 30, preferably 1 to 10, carbon atoms.

The perfluoroalkylsulfonic acids suitable for use herein are prepared by electrolysis of the corresponding hydrocarbyl alkyl sulfonic acid halides in the presence of anhydrous liquid hydrogen fluoride, conversion of the resulting perfluoroalkyl sulfonyl halide to its sodium or potassium salt by treatment with sodium hydroxide or potassium hydroxide, and distillation of the resulting sodium or potassium salt from concentrated sulfuric acid to provide the perfluoroalkyl sulfonic acid. In this general fashion, perfluoroalkyl, including perfluorocycloalkyl, sulfonic acids having substantially any chain length can be prepared. For example, using the processes of U.S. Pat. 2,732,398, there can be prepared trifluoromethane sulfonic acid, pentafluoroethane sulfonic acid, heptafluoropropane sulfonic acid, perfluorodecane sulfonic acid, perfluorooctadecane sulfonic acid, perfluorocyclohexane sulfonic acid, and the like. In like manner, perfluoroalkane disulfonic acids can be prepared. These compounds are of the formula $R_f^1(SO_3H)_2$ wherein $R_f^1$ is a moiety of the formula $-(CF_2)_n-$, where n is an integer, especially 1 to 10. Of these there can be mentioned, for example, perfluoro(decane - 1,10 - disulfonic)acid and perfluoro(octane-1,8-disulfonic)acid. It is to be understood that the term perfluoroalkyl sulfonic acid as used herein also encompasses the perfluorocycloalkyl sulfonic acids and perfluoroalkyl disulfonic acids, all of which are suitable for use as the catalyst herein. Trifluoromethane sulfonic acid, $CF_3SO_3H$, is the preferred catalyst in the instant process; $(CF_3SO_2)_2O$ is also preferred.

The partial polyol esters to be esterified in the manner of this invention are derived from polyols selected from the group consisting of (1) aliphatic diols where the hydroxyl groups are unsymmetrically substituted with respect to the carbon chain, or (2) aliphatic polyols containing at least three hydroxyl groups. These diols and polyols are preferably those esterified with acyl substituents derived from monocarboxylic acids containing from 8 to 22 carbon atoms, although the position-specific esterification is independent of this chain length.

Partial polyol esters derived from aliphatic diols include for example, esters derived from 1,2-propylene glycol, 1,2-butanediol and 1,3 - butanediol. Partial polyolesters derived from aliphatic polyols containing at least three hydroxyl groups include, for example, esters derived from glycerin, 1,2,4-butanetriol, erythritol, arabitol, xylitol, 1,2,6-hexanetriol, sorbitol and mannitol. The ester groups of these partial polyol esters include, for example, those derived from caprylic, capric, lauric, myristic, palmitic, stearic, oleic, linoleic, linolenic, arachidic and behenic acids.

Partial polyol esters which are preferred for use herein are partial glyceride esters including 1- and 2-monoglycerides and 1,2- and 1,3-diglycerides. The monoglyceride ester groups can be saturated or unsaturated. The diglycerides include disaturated, monoacid diglycerides, e.g., distearin; disaturated, diacid diglycerides, e.g., 1-palmitoyl-3-stearoyl glycerol, diunsaturated, monoacid diglycerides, e.g., diolein; diunsaturated, diacid diglycerides, e.g., 1-oleoyl-3-palmitoleoyl glycerol; and monounsaturated, monosaturated, diacid diglycerides, e.g., 1-palmitoyl-3-palmitoleoyl glycerol. The terms "diacid" and "monoacid" are used herein to denote glycerides having two different acyl substituents and one kind of acyl substituent respectively. The preparation of partial polyol esters for use in the instant process is fully described in Mattson and Volpenhein, Journal of Lipid Research, July 1962, vol. 3, No. 3, pp. 281–296.

Specific partial carboxylic acid esters of 1,2-propylene glycol can also be used in the present process. Most 1-mono-fatty acid esters of 1,2-propylene glycol, such as 1-propylene glycol mono-stearate, can be prepared by reacting 1,2-propylene glycol with a desired fatty acid, such as stearic acid, in the presence of a catalyst, such as p-toluene sulfonic acid, and in a solvent, such as xylene, and the 1-fatty acid ester separated by fractional crystallization, for instance. 2-mono-fatty acid esters of 1,2-propylene glycol, such as 2-propylene glycol monobehenate, can be prepared by acylation of an appropriately blocked 1,2-propylene glycol derivative, such as 1-tetrahydropyranyl propylene glycol, with an acid chloride, such as behenoyl chloride, and cleavage of the blocking group in the presence of boric acid.

The symmetrical acidic lipid anhydrides which are preferred for use in esterifying the above partial polyol esters have the structural formula:

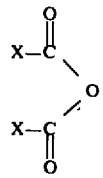

wherein each X is a substituent selected from the group consisting of:

(1) alkyl and alkenyl groups containing from 7 to 21 carbon atoms and having the formula

R—

(2) residues of alkyl and alkylene half-esters of a dicarboxylic acid having the formula

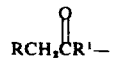

(3) residues of monoacyl diol half-esters of a dicarboxylic acid having the formula

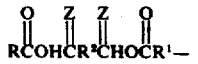

(4) residues of diacyl glyceride half-esters of a dicarboxylic acid having the formula

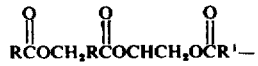

and (5) residues of monoacyl derivatives of a primary monohydroxy monocarboxylic acid having the formula

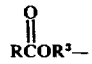

wherein in (1)–(5) above:

R is an alkyl or alkenyl group having 7 to 21 carbon atoms;

$R^1$ is an alkylene group having 2 to 4 carbon atoms;

$R^2$ is an alkylene group having 0 to 4 carbon atoms;

$R^3$ is an alkylene group having 2 to 5 carbon atoms; and

Z is a group selected from the group of hydrogen and methyl.

Another class of acid anhydrides suitable for use in the instant process are those of the formula

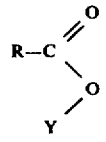

wherein R is selected from the group consisting of alkyl and alkenyl substituents having from 7 to 21 carbon atoms and Y is selected from the group consisting of benzoyl, p-nitrobenzoyl and alkyl phosphoryl substituents of the formula

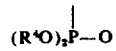

wherein $R^4$ is a $C_1$ to $C_5$ alkyl or phenyl substituent. These unsymmetrical acid anhydrides are fully described in U.S. Pat. 3,337,596, incorporated herein by reference.

The acid lipid anhydrides in the present process can be prepared in well-known fashion by admixing the corresponding acidic lipid with an excess of acetic or propionic anhydride, cooling the reaction product, crystallizing the acid lipid anhydride and collecting the desired product by filtration. The unsymmetrical anhydrides are prepared as described in U.S. Pat. 3,337,596.

The most effective processes for the formation of acidic lipid anhydrides useful in this invention employed metathesis with acetic anhydride either at low temperatures, i.e., 32° F. to 140° F., with perchloric acid catalysis, or at higher temperature, i.e., 140° F. to 300° F., without perchloric acid catalysis, but with evaporation of the acetic acid formed in the reaction.

Acidic lipids for use in preparing the acidic lipid anhydrides by the above methods can be derived from a variety of sources, depending on the specific acidic lipid involved. The acidic lipids for use herein include aliphatic monocarboxylic acids, alkyl half-esters of dicarboxylic acids, monoacyl diol half-esters of dicarboxylic acids, diacyl glyceride half-esters of dicarboxylic acids, and monoacyl derivatives of primary monohydroxy monocarboxylic acids.

The monocarboxylic acids contain from 8 to 22 carbon atoms and include, for example, stearic and oleic acids. They can be readily obtained from glycerides by saponification, acidulation and isolation procedures or by hydrolysis. The acid desired determines the choice of glyceridic material. For example, a technical grade of stearic acid can be obtained from hydrogenated soybean oil and a technical grade of oleic acid can be obtained from olive oil.

The alkyl half-esters of dicarboxylic acids are condensation products of dicarboxylic acids having from 4 to 6 carbon atoms with straight chain fatty alcohols containing 8 to 22 carbon atoms. Useful dicarboxylic acids include succinic, glutaric and adipic acids. Useful alcohols include, for example, cetyl and octadecyl alcohols. The dicarboxylic acids are advantageously condensed with the fatty alcohols in a mutual solvent such as dimethylformamide, dimethylacetamide, dioxane, xylene or toluene, either with or without the use of a catalyst such as sulfuric acid, p-toluene sulfonic acid, hydrogen chloride, zinc chloride, and other such catalysts. These preparations are best carried out with reaction temperatures in the range of from 175° F. to about 350° F. with water being removed under reduced pressure. The desired condensation products are isolated by appropriate distillation, and/or washing, and/or crystallization treatment if such treatments are required to remove solvents, excess reactants and impurities.

The monoacyl diol half-esters of dicarboxylic acids are the reaction products of monoacyl diols and dicarboxylic acid anhydrides. The diols for use in preparing these lipids contain from 2 to 6 carbon atoms and can contain either primary or secondary hydroxy groups. Useful diols include, for example, ethylene glycol, 1,2-propylene glycol, 1,3 - propanediol, 1,4 - butanediol, 1,3-butanediol and 1,5 - pentanediol. An excess of one of these diols is condensed with a straight chain monocarboxylic acid, containing 8 to 22 carbon atoms, such as stearic or oleic acid, in the presence of an esterification catalyst, such as sulfuric acid, and preferably with refluxing with xylene. This condensation reaction yields a monoacyl diol which in turn is reacted at a temperature ranging from 175° F. to 350° F. with the anhydride of a dicarboxylic acid containing 4 to 6 carbon atoms such as succinic, glutaric and adipic acids, to form the desired lipid.

The diacyl glyceride half-esters of a dicarboxylic acid are reaction products of diacyl glycerides and dicarboxylic acid anhydrides. The diacyl glycerides for use in preparing these lipids contain acyl groups derived from straight chain monocarboxylic acids containing from 8 to 22 carbon atoms, such as stearic and oleic acids, and can be prepared as described in the previously referred to Mattson and Volpenhein reference. These diacyl glycerides are reacted at a temperature ranging from 175° F. to 350° F. with the anhydride of a dicarboxylic acid containing from 4 to 6 carbon atoms, such as succinic, glutaric and adipid acids, to form the desired lipids.

The monoacyl derivatives of a primary monohydroxy-monocarboxylic acid are reaction products of monocarboxylic acid chlorides containing from 8 to 22 carbon atoms, such as stearic and oleic acid chlorides, with primary monohydroxy-monocarboxylic acids having from 3 to 6 carbon atoms. Suitable monohydroxy-monocarboxylic acids include hydracrylic, 4-hydroxybutyric, 3-hydroxypentanoic, and 6-hydroxyhexanoic acids. The desired lipids can be prepared from these acid chlorides and monohydroxy-monocarboxylic acids as described in U.S. Pat. 2,251,694.

The unsymmetrical anhydrides useful herein are prepared by reacting the triethylammonium salt of one acid with the acid halide of the other acid in the manner fully described in U.S. Pat. 3,337,596.

As previously explained, the above partial polyol esters are reacted with the above acidic lipid anhydrides at a 1:1 mole ratio in the presence of a perfluoroalkyl sulfonic acid catalyst. In a preferred mode, an excess of the acidic lipid anhydride is employed over that required by the stoichiometry of the reaction; a 10% to 100% molar excess is preferred. The maximum amount of excess lipid anhydride is not critical and molar excesses of 10 to 20 times can be employed, particularly when the anhydride is being used as the reaction solvent, as noted below. The molar ratio of perfluoroalkyl sulfonic acid on perfluoroalkyl sulfonic acid anhydride to acid lipid anhydride should be at least about 0.01 to 1. A maximum limit of 0.50 to 1 for this molar ratio is most preferred, for economic reasons, but higher ratios are operable.

The position-specific esterification reaction of this invention takes place over a wide range of temperatures and in the presence of a wide variety of solvents without ester group rearrangement. Reaction temperatures can range from −30° F. to 350° F., with 0° to 212° F. being preferred. The reaction can in most cases be carried out at room temperature (ca. 70° F.). It is noted that the reaction normally occurs at room temperature in a time period ranging from one minute to five hours. Thus, the reaction of this invention is very rapid when compared with esterification with acid chlordes, which at room temperature normally takes from 10 hours to 24 hours for substantial reaction completeness.

In general, the solvent, if any, can be any organic liquid medium which will form a phase sufficiently uniform so as to bring the reactants into contact. Preferably if it is a liquid, a molar excess of the acid lipid anhydride is used as the solvent, this excess being calculated on the basis of only one acidic lipid radical of each anhydride molecule reacting. Other useful solvents include chlorinated hydrocarbons such as chloroform and carbon tetrachloride, aromatic hydrocarbons such as benzene and aliphatic esters such as ethyl acetate. Still other useful solvents include aromatic heterocyclic bases such as pyridine, tertiary amides such as dimethylformamide and dimethylacetamide, heterocyclic oxides such as tetrahydrofuran, and fatty acids.

In the case where monoglycerides are the partial polyol esters, the specific solvent used seems to have some effect on whether substantially no ester group rearrangement occurs; benzene and pyridine are desirably used as solvents in this case.

Turning now to one specific application of the above described general process, that is, a process for preparing synthetic cocoa butter, it has been found that certain 1,3-diglycerides can be esterified with oleic acid anhydride by the above described general method to provide synthetic cocoa butter. This process is illustrated by the following equation:

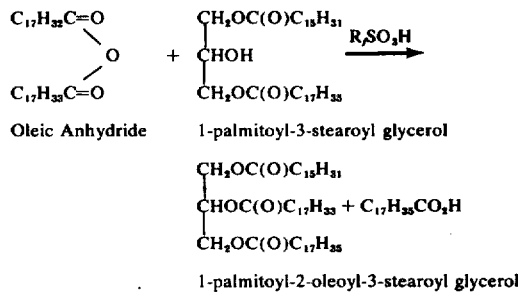

Although the stoichiometry of the reaction indicates that at a 1:1 molar ratio of acid anhydride:polyol two moles of acid are present, the second mole of acid is not involved in the esterification since it is not in the anhydride form. Of course, anhydride:polyol mole ratios of less than 1:1 can be used herein, but this results in proportionate amounts of unesterified polyol in the product.

The 1,3-diglycerides used in this process can be obtained by superglycerination of lard or of substantially completely hydrogenated palm oil in the presence of triacetin using the method of Baur and Lange, Journal of the American Chemical Society, 1951, vol. 73, p. 3926.

The following example illustrates the preparation of synthetic cocoa butter in greater detail but is not to be construed in any way as limiting the scope of the invention. Unless otherwise specified, all percentages in the following examples are by weight.

EXAMPLE I

Synthetic cocoa butter preparation

Three hundred and four grams of palm oil hydrogenated to an iodine value of 8 and having an acid value of 0 are reacted with 157 grams of water-washed and distilled triacetin in the presence of 26 ml. of sodium methoxide catalyst in the form of a xylene suspension (0.09 gm. sodium methoxide per ml. xylene) at 195° F. with stirring for 1.5 hours. At this point, 58 grams of dry glycerol are added; heating and stirring are continued for one more hour. The reaction mixture is then allowed to cool with stirring and is stored at room temperature for two days.

Undesirable components are then removed from the reaction mixture by the following purification procedure: the solid mass resulting after the two-day storage is slurried with 30 ml. of aqueous acetic acid solution containing 50% water by volume. The slurry is dissolved in 4 liters of ethanol-hexane solution (50% ethanol by volume) and the resulting solution cooled to 50° F. This temperature is maintained for a four-hour period, during which time crystals are formed. At the end of the four-hour period, the crystals are separated by vacuum filtration and recrystallized overnight from 3 liters of ethanol-hexane solution (50% ethanol by volume). The crystals recovered by filtration are dissolved in one liter of ethyl ether and water-washed three times. The ether is removed by evaporation and the residue crystallized from 2.5 liters of ethanol-hexane solution (50% ethanol by volume) at 50° F. After filtration the crystals are air dried to provide the substantially pure product.

Analysis of the above product shows it to be substantially all 1,3-diglyceride containing palmitoyl and stearoyl groups. The above product has a hydroxyl value of 90–92 as compared to a theoretical value of 94.2 for 100% diglyceride and contains less than 0.5% monoglycerides. It has a complete melting point of 159° F. to 160° F. Analysis for specific acid groups shows the presence of ca. 35% palmitic and ca. 65% stearic, and minor amounts of myristic, all by weight with each acid group expressed as the corresponding acid.

Oleic anhydride is prepared by refluxing 100 grams of oleic acid in 300 grams of acetic anhydride for three hours. The bulk of the distillable material present, mostly acetic acid, is then removed at atmospheric pressure. The residue is then heated at 355° F. under 1 to 2 mm. Hg pressure for 30 minutes to distill the remaining volatile impurities.

Sixty grams of the 1,3-diglyceride mixture prepared in the foregoing manner and comprising about 45% 1-palmitoyl-3-stearoyl glycerol, 42% 1,3-distearoyl glycerol, about 11% 1,3-dipalmitoyl glycerol, the balance being mixed 1,3-diglycerols, were admixed with 250 grams of a 1:1 mixture of oleic acid and oleic anhydride prepared as described above. One ml. of trifluoromethane sulfonic acid was added to the mixture and the reactants were stirred together at room temperature for one hour. An equal volume of water was added to the reaction mixture, which was then heated to 160° F.–212° F. for one hour to hydrolyze excess oleic anhydride. The water was removed by filtration and the residue extracted five times with equal volumes of methanol to remove traces of free acid. The residue was substantially pure triglyceride product.

The product has an acid value of about 1.8 and a hydroxyl value of about 2.0, i.e., substantially all triglyceride.

Analysis for specific acid groups present in the synthetic triglyceride so formed shows ca. 22.8% palmitic, 44.0% stearic and 33.0% oleic, all by weight with each expressed as the corresponding acid. In comparison, a commercially-available, natural cocoa butter contains 25% palmitic, 34% stearic, 36% oleic and 3% linoleic, all by weight with each acid group expressed as the corresponding acid. Thus, the above synthetic triglyceride and cocoa butter contain substantially similar weight proportions of each of the same fatty acids.

Analysis for 2-position fatty acids by the method of Mattson and Volpenhein, Journal of Lipid Research, January 1961, vol. 2, No. 2, pp. 58–64, namely, by hydrolysis of the triglyceride with pancreatic enzyme and analysis of the resulting monoglyceride fatty acids, shows that the above synthetic triglyceride contains about 90% by weight of oleic acid esterified at the 2-position as compared to about 86% by weight of oleic acid at the 2-position in the commercially-available cocoa butter. The percentages of oleic acid are by weight of all acids at the 2-position, the acyl group attached thereto being expressed as the corresponding acid. Accordingly, it is seen that substantially no ester group rearrangement occurs in this process.

Further similarity between the above 2-oleoyl triglyceride composition and the commercially-available cocoa butter is shown by a comparison of consistencies as follows. Samples of the synthetic triglyceride and of commercially-available cocoa butter are melted; chilled in ice for five minutes; held for one day at 70° F.; held for one week at 80° F.; and held overnight at 50° F.; and the solids content at these various temperatures determined at the end of the period by the dilatometric method as described in Fulton, Lutton and Willie, Journal of the American Oil Chemists Society, March, 1954, vol. XXXI, No. 3, pp. 98–103. Comparison of the "melting" curves for the synthetic triglyceride and for the commercially-available cocoa butter shows that both of these products have similar consistencies over the range of temperatures from about 70° F. to about 95° F., that range of temperatures over which cocoa butter has its unique melting characteristics.

In summary, the above synthetic triglyceride has substantially similar weight proportions and distribution of fatty acids and substantially equivalenet consistency characteristics to a commercially-available cocoa butter.

In the above procedure, the trifluoromethane sulfonic acid is replaced by an equivalent amount of trifluoromethane sulfonic anhydride, pentafluoroethane, sulfonic anhydride, perfluoroisopropyl sulfonic acid, heptafluoropropane sulfonic acid, perfluorooctadecane sulfonic acid, perfluorocyclohexane sulfonic acid, perfluorotricosane sulfonic acid, and perfluoro(decane-1,10-disulfonic) acid, respectively, and equivalent results are secured in that a synthetic cocoa butter is secured with little or no ester rearrangement.

The above procedure is carried out in a solvent amount of dry chloroform with equivalent results.

The above procedure is carried out at 0° F. and 212° F. (pressure vessel), respectively, and equivalent results are obtained.

In the above procedure, the oleic anhydride is replaced by an equivalent amount of oleic-benzoic anhydride, oleic-p-nitrobenzoic anhydride and oleic-ethylphosphoryl anhydride, respectively, and the synthetic cocoa butter 2-oleoyl triglycerides are secured in each instance.

The above procedure is carried out using mole ratios of perfluoroalkyl sulfonic acid and perfluoroalkyl sulfonic anhydrides-to-acidic lipid anhydride of 0.01:1 with equivalent results.

EXAMPLE II

Esterification of 1,3-dipalmitin with oleic anhydride

Twenty grams of 1,3-dipalmitin made as described in Example 2 of U.S. Pat. 2,626,952 and 30 ml. of oleic anhydride made as in Example I herein are admixed in 50 ml. of water-washed, distilled and dried chloroform in the presence of 1.0 ml. of trifluoromethane sulfonic acid. The reactants are stirred at room temperature for three hours.

The reaction mixture is dissolved in 500 ml. ethyl ether together with 100 ml. water. The ether phase is water-washed three times, dried and evaporated in an inert atmosphere. The residue is crystallized twice from acetone at 20° F. and the crystals dried to provide substantially pure triglyceride product.

The product has an acid value of ca. 0.8 and a hydroxyl value of 2.0, showing that substantially all the roduct is triglyceride. The 2-position fatty acids are olated by the pancreatic enzyme procedure of Exam- le I and the triglyceride is found to contain 90–95% by eight oleic acid at the 2-position, i.e., 1-palmitoyl-2- leoyl-3-palmitoyl glycerol, demonstrating that sub- antially no existing ester group rearrangement occurs uring the above esterification reaction.

In the above procedure the 1,3-dipalmitin is replaced y an equivalent amount of 1,3-distearoyl glycerol, -palmitoyl-3-stearoyl glycerol, 1-palmitoyl-3-lauroyl ycerol and 1-behenoyl-3-stearoyl glycerol, respec- vely, and the corresponding 2-oleoyltriglycerides are rmed without ester group migration.

In the above procedure the chloroform is replaced by 1 equivalent amount of carbon tetrachloride, benzene nd hexane, respectively, and equivalent results are ecured.

The above procedure is repeated using an equivalent nount of 1,2-dipalmitin as the partial glyceride and -oleoyldipalmitin is secured, demonstrating that es- entially no ester group rearrangement occurs with the erfluoroalkyl sulfonic acid catalyst herein.

EXAMPLE III sterification of 1,3-dipalmitin with rapeseed oil fatty acid anhydride

Rapeseed oil fatty acid anhydride is formed as fol- ows: rapeseed oil is hydrolyzed to the corresponding apeseed oil fatty acids. These fatty acids are formed ito the corresponding long chain fatty acid anhydrides y the anhydride-forming process disclosed in Example The anhydrides so formed are for the most part ixed anhydrides, that is, each anhydride molecule ontains two different fatty acid groups. These anhy- rides react in the same manner as if each molecule ontains two identical fatty acid groups.

Two grams of rapeseed oil fatty acid anhydride, 1.5 rams of 1,3-dipalmitin prepared as in Example II, 10 l. purified chloroform and 0.025 ml. trifluorome- hane sulfonic acid are reacted together with mixing at oom temperature (ca. 70° C.) for one hour. The reac- on product is diluted with 100 ml. ethyl ether, water- ashed and the solvent evaporated in an inert atmo- phere. The residue is crystallized three times from 75 l. acetone at 20° F. to provide the purified product.

Thin layer chromatography shows that substantially l the product is triglyceride. Analysis of the triglycer- le by the pancreatic enzyme procedure of Example I nd comparison of the 2-position fatty acid composi- on of the triglyceride with the original rapeseed oil tty acids indicates that the palmitic, stearic, oleic, almitoleic, linoleic, linolenic and erucic acid fractions f the rapeseed oil each esterify the 1,3-dipalmitin at e 2-position with substantially no acyl group migra- on.

EXAMPLE IV

Esterification of 2-monostearin

One-half gram of 2-monostearin made by the process escribed in Martin, Journal of the American Chemical ociety, 1953, vol. 75, page 5482, 1.84 grams oleic nhydride made as in Example I, 10 ml. benzene and .01 ml. trifluoromethane sulfonic acid are reacted gether with mixing at 70° F. for three hours.

The reaction mixture is diluted with ethyl ether, wa- r-washed and the solvent removed by evaporation. he residue is crystallized twice from 20 ml. acetone at 20° F. Substantially all the product is 2-stearoyldiolein; therefore, substantially no existing ester group rearrangement occurs during the esterification reactions.

In the above procedure, the benzene solvent is replaced with an equivalent amount of pyridine with equivalent results.

In the above procedure the trifluoromethane sulfonic acid is replaced by an equivalent amount of perfluorooctyl sulfonic anhydride, perfluorodecyl sulfonic anhydride, perfluorooctadecyl sulfonic anhydride, perfluorocyclohexyl sulfonic anhydride, perfluorocyclopentyl sulfonic anhydride, and the corresponding acids of these perfluoroalkyl anhydrides, respectively, and equivalent results are secured.

EXAMPLE V

Esterification of 1-monostearin with stearoyl propylene glycol succinate anhydride Forty-four grams (0.1 mole) of stearoyl propylene glycol hydrogen succinate are mixed with 30 grams (0.3 mole) of acetic anhydride and heated at reflux for one hour. The mixture is then heated at 250° F. to 265° F. for two hours under a pressure of 2–5 mm. Hg. The residue is cooled with recovery of about a 96% yield of stearoyl propylene glycol succinate anhdyride (an anhydride having the previously described structural formula wherein X is a residue of a monoacyl diol half-ester of a dicarboxylic acid).

Three and six-tenths grams of 1-monostearin (0.01 mole) prepared by the process described in Mattson and Volpenhein, Journal of Lipid Research, July 1962, vol. 3, No. 3, pp. 283, 284, is dissolved in 144 ml. benzene with slight warming. Nineteen grams (0.022 mole) of the above prepared stearoyl propylene glycol succinate anhydride is added with stirring. The sample is treated with 0.1 ml. trifluoromethane sulfonic acid catalyst and stirring continued at 90° F. for one hour.

The reaction mixture is diluted with 100 ml. water and the mixture shaken in a separatory funnel. The washed benzene solution is dried and the product isolated by chromatography on a 300 gram silica gel (+5% water) column. Elution with one liter of benzene and with one liter of benzene containing 2% ethyl ether and 1% acetic acid yields about 11 grams of product. Fractional crystallization of the product from 15 volumes of acetone at 70° F., 50° F. and 0° F. provides a product comprising 90% 1-stearoyl-2,3-di(stearoyl propylene glycol succinyl) glycerol having the structural formula

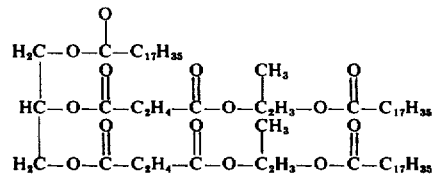

Substantially no existing ester group rearrangement occurs during the above esterification reaction.

EXAMPLE VI

Esterification of 1,3-distearin with octadecyl glutarate anhydride

Octadecyl glutarate anhydride (an anhydride having the previously described structural formula wherein X is a residue of an alkyl half-ester of a dicarboxylic acid)

is prepared the same as the anhydride in Example V but with substitution of a molar equivalent of octadecyl hydrogen glutarate for the stearoyl propylene glycol hydrogen succinate.

Six and two-tenths grams distearin prepared as in Example I of U.S. Pat. 2,626,952 are dissolved in 120 ml. benzene with stirring and slight warming. Seven and nine-tenths grams of the above octadecyl glutarate anhydride are added; when the reagents are completely dissolved, 0.1 ml. of trifluoromethane sulfonic acid is added. The mixture is then stirred at room temperature for one hour.

The reaction mixture is diluted with 100 ml. water and the aqueous layer separated and discarded. The benzene layer is washed twice with water, dried with five grams sodium sulfate, filtered and evaporated to dryness. The residue is crystallized from 200 ml. acetone at 195° F. The crystals are recrystallized from 150 ml. acetone at 212° F. to provide 95% pure 1,3-distearoyl-2-octadecyl glutaryl glycerol. Substantially no existing ester group rearrangement occurs during the above esterification reaction.

EXAMPLE VII

Esterification of 1,3-distearin with 1,3-distearin-2-succinate anhydride 1,3-distearin-2-succinate anhydride (an anhydride having the previously described structural formula wherein X is a residue of a diacyl glyceride half-ester of a dicarboxylic acid) is prepared the same as the anhydride in Example V but with substitution of a molar equivalent of 1,3-distearin-2-hydrogen succinate for the stearoyl propylene glycol hydrogen succinate.

Six and two-tenths grams 1,3-distearin are dissolved in 250 ml. benzene with stirring and slight warming. Fifteen grams of the above 1,3-distearin-2-succinate anhydride are added and dissolved with stirring. When the reagents are completely dissolved, 0.2 ml. of trifluoromethane sulfonic acid is added and the reaction mixture stirred at 100° F. for one hour.

In order to purify the product, 100 ml. water are added and the aqueous phase separated and discarded. The product is further purified by treatment with three 30-gram portions of base-form ion exchange resin. The benzene solution is evaporated and the residue crystallized from 200 ml. acetone at 90° F. to provide pure di(1,3-distearin) succinate. Substantially no existing ester group rearrangement occurs during the above esterification reaction.

In the above process the trifluoromethane sulfonic acid is replaced by an equivalent amount of pentafluoroethyl sulfonic acid and the reaction is carried out at 0° F., 30° F. and 200° F., respectively, with equivalent results.

EXAMPLE VIII

Esterification of propylene glycol monooleate with stearoyl-4-hydroxybutyric anhydride One mole 1,2-propylene glycol is reacted with 0.5 mole oleic acid in one liter of xylene in the presence of 0.01 mole of p-toluene sulfonic acid catalyst. The sample is refluxed under a moisture trap for two hours, poured into ice water, water-washed and solvent-evaporated to provide 70% pure propylene glycol monooleate. The impure product is purified with a silica gel column to provide about 0.35 mole of substantially pure propylene glycol monooleate. The propylene glycol monooleate is present as a mixture of isomeric esters with 80% of the oleoyl groups at the primary hydroxyl position and 20% at the secondary position of 1,2-propylene glycol.

Stearoly-4-hydroxybutyric anhydride (an anhydride having the previously described structural formula wherein X is a residue of a monoacyl derivative of a primary monohydroxy monocarboxylic acid) is prepared the same as the anhydride in Example V but with substitution of a molar equivalent of stearoyl-4-hydroxybutyric acid for the stearoyl propylene glycol hydrogen succinate.

Three and four-tenths grams of the above propylene glycol monooleate are dissolved in 100 ml. benzene. Ten grams of the above stearoyl-4-hydroxybutyric anhydride are added to the solution and stirred with slight warming until dissolution is complete. When the reagents are completely dissolved, 0.1 ml. trifluoromethane sulfonic acid is added and stirring continued at 70° F. for one hour.

In order to purify the desired product, the reaction mixture is diluted with 100 ml. water and the aqueous phase is separated and discarded. The benzene layer is evaporated to dryness and the residue is dissolved in 100 ml. hexane. The hexane solution is crystallized at 50° F. to yield primarily stearoyl-4-hydroxybutyric acid. The filtrate from the 50° F. crystallization is evaporated to dryness and this residue is dissolved in 200 ml. acetone. The acetone solution on crystallization at 40° F. provides oleoyl (stearoyl-4-hydroxybutyryl) propylene glycol. The product consists of a mixture of isomeric esters with 80% by weight of the oleoyl groups at the primary hydroxyl position and 20% at the secondary hydroxyl position of 1,2-propylene glycol. This mixture of isomers results from the fact that the propylene glycol monooleate used consists of an 80–20 mixture of primary and secondary esters respectively. Thus, substantially no existing ester group rearrangement occurs during the above esterification reaction.

EXAMPLE IX

Esterification of 1-propylene glycol mono-behenate with oleic anhydride 1-propylene glycol monobehenate is made as follows: ethyl lactate (450 grams, 3.8 moles) is mixed with 1.2 ml. concentrated hydrochloric acid and the mixture cooled in an ice bath. Dihydropyran (420 grams, 4.9 moles) is added with stirring, after which the sample is allowed to warm to room temperature. After three hours, 10 grams of potassium carbonate are added and the sample stirred. The product is distilled under reduced pressure with collection of 366 grams tetrahydropyranyl ether lactate boiling at 65° to 70° C. at 1–2 mm. pressure. Tetrahydropyranyl ethyl lactate (82 grams, 0.46 mole) is dissolved in 300 ml. tetrahydrofuran and the solution is cooled in an acetone-ethanol Dry Ice bath. The THP ethyl lactate solution is added slowly to a 10% lithium aluminum hydride solution and subsequently the mixture is warmed to room temperature. The reactants are diluted with 150 ml. ethanol, followed by two liters of water. The sample is then extracted three times with 400 ml. portions of benzene. The benzene extracts are dried with sodium sulfate, filtered, and the filtrate is distilled with collection of the fraction boiling at 78–81° C. at 3 mm. pressure. The yield is 28 grams of 2-tetrahydropyranyl propylene glycol.

2-tetrahydropyranyl propylene glycol (16.0 grams, .1 mole) is interesterified with 39 grams methyl benenate using 4 ml. of 40% trimethyl benzyl ammonium methoxide as a catalyst. The reactants are stirred in a 50 ml. flask heated at 60–80° C. under a reduced pressure of 200 mm. Hg for 6 hours. The reactants are poured into 600 ml. of hexane and the hexane solution washed with 400 ml. of 1% potassium bicarbonate solution. The washed hexane layer is diluted with 200 ml. ethanol and 75 grams urea are added to the sample. Adduct formation with urea is accomplished by stirring the sample initially at 40° C. and allowing the mixture to cool at 25° C. during a two-hour interval. The urea adduct is removed by filtration and discarded. The adduction with urea is repeated using 60 grams urea. The filtrate from the second urea adduction is water-washed three times and the hexane layer is evaporated to dryness. The residue is dissolved in 300 ml. hexane the solution is crystallized at −18° C. filtration at −18° C. yields 21.3 grams of 1-behenoyl-2-tetrahydropyranyl propylene glycol. 1-behenoyl-2-tetrahydropyranyl propylene glycol (8 grams, 0.0165 mole) is cleaved by reaction with 11 ml. of 1.6 molar boric acid in trimethyl borate. The reactants are heated in a boiling water bath with application of vacuum. Heating is continued for 5 minutes with a vacuum of 2–5 mm. Hg pressure during the final 10 minutes. The residue is cooled to room temperature and dissolved in 200 ml. ethyl ether and water-washed three times. The ether phase is dried with sodium sulfate, and evaporated to dryness on an evaporator without warming above 30° C. The residue is dissolved in 100 ml. petroleum ether and crystallized at 70° F. The crystals recovered at 70° F. are recrystallized from 200 ml. petroleum ether at 50° F. to yield ca. 5 grams of 1-propylene glycol monobehenate.

Five grams of the above prepared 1-propylene glycol monobehenate are dissolved in 100 ml. benzene together with 6 grams oleic anhydride made as in Example I. The sample is stirred at room temperature until solution is complete. One-tenth ml. trifluoromethane sulfonic acid is added and the sample stirred for 30 minutes at room temperature.

In order to purify the product 100 ml. water are added and the aqueous phase separated and discarded. The benzene solution is evaporated to dryness and the residue dissolved in 100 ml. acetone. The acetone solution is crystallized at 0° F. with recovery of 95% pure 1-behenoyl-2-oleoyl propylene glycol. Substantially no existing ester group rearrangement occurs during the above esterification reaction.

EXAMPLE X

Esterification of 1,4-distearoyl erythritol with oleic anhydride

One mole erythritol is reacted with two moles methyl stearate in one liter of dimethylacetamide in the presence of 0.1 mole sodium methoxide catalyst. The reaction mixture is heated at 100–120° C. under reduced pressure (80–100 mm. Hg) for three hours with slow distillation of solvent such that about 400 ml. of solvent is removed in the three-hour period. Twenty cc. of 50% by volume aqueous acetic acid are added to the sample and this mixture poured into two liters of water. One liter of an ethyl acetate-butanol mixture (four parts by volume ethyl acetate to one part by volume butanol) is added. The ethyl acetate-butanol layer is separated, water-washed twice and treated with 500 grams urea. This mixture is stirred at room temperature for two hours. The mixture is then filtered and 0.12 mole of 1,4-distearoyl erythritol is recovered from the urea adduct by dissolving in acetone and crystallizing at 90° F.

Six and one-half grams of the above 1,4-distearoyl erythritol are dissolved in 200 ml. ethyl acetate with slight warming while stirring. Six and six-tenths grams oleic anhydride prepared as in Example I are added, followed by 0.1 ml. trifluoromethane sulfonic acid. The reaction mixture is stirred at room temperature for one hour.

In order to purify the product, the reaction mixture is washed three times with water and the ethyl acetate solution dried with 15 grams of sodium sulfate and filtered. The solution after crystallizing 24 hours yields substantially pure 1,4-distearoyl-2,3-dioleoyl erythritol. Substantially no existing ester group rearrangement occurs during the above esterification reaction.

The foregoing examples illustrate the use of the perfluoroalkyl sulfonic acids and perfluoroalkyl sulfonic anhydrides in the esterification of partial polyol esters with acid lipid anhydrides of various types. The examples are not intended to be limiting of the types of acid anhydrides and types of partial polyol esters useful in the process of this invention. As will be seen from the following example, carboxylic acid anhydrides having hydrocarbyl substituents from 1 to about 30 carbon atoms and aryl substituents such as phenyl, tolyl, xylyl, naphthyl and the like, are also suitably employed in conjunction with partial polyol esters of all types to provide position-specific esterification reactions. Furthermore, the partial polyol esters useful herein are not limited in their type and can contain ester groups having from 1 to about 30 carbon atoms, and greater. It is to be understood, therefore, that the position-specific esterification reaction herein appears to be a general one in that it provides for the esterification of all manner of partial polyol esters by means of all manner of organic acid anhydrides without substantial ester group rearrangement.

EXAMPLE XI

Esterification of 1,3-dipropanoyl glyceryl with acetic anhydride

One mole of 1,3-dipropanol glycerol is admixed with two moles of acetic anhydride and dissolved therein with heating and stirring at a temperature of about 175° F. 0.5 mole of trifluoromethane sulfonic acid are admixed with the reaction solution and the temperature is restored to room temperature (70° F.) over a two hour period. The reaction mixture is poured into 1 liter of water which serves to hydrolyze the unreacted acetic anhydride.

Excess water is removed by vacuum evaporation at about 90° F. on a rotary evaporator, which process also removes much of the acetic acid. The resulting residue left after evaporation is dissolved in a 1:1 mixture of ethyl alcohol and benzene and a 1.0 M solution of barium chloride is added thereto, portionwise, until precipitation of the insoluble barium acetate monohydrate is complete. The solids are removed by filtration and the benzene-alcohol solvent is evaporated on the rotary evaporator under vacuum. The resulting triglyceride product is substantially pure 1-propanoyl-2-acetyl-3-propanoyl glycerol, indicating that the esterification occurs without substantial intramolecular or intermolecular acyl group rearrangement.

The above procedure is carried at 0° F. and 212° F., respectively, with substantially equivalent results.

The procedure is carried at a catalyst-to-anhydride mole ratio of 0.01:1 with equivalent results.

The trifluoromethane sulfonic acid used in the above process is replaced by an equivalent amount of trifluoromethane sulfonic acid anhydride, perfluoro(octane-1,8-disulfonic)acid, perfluoro(hexane-1,6-disulfonic)acid, perfluorotricosane sulfonic anhydride, perfluorocyclo-hexane sulfonic acid, and perfluorocyclohexane sulfonic acid anhydride, respectively, and equivalent results are secured.

In the above procedure the acetic anhydride is replaced by an equivalent amount of benzoic acid anhydride and the reaction product is substantially all 1-propanoyl-2-benzoyl-3-propanoyl glycerol, indicating that substantially no ester group rearrangement occurs in the process.

What is claimed is:

1. A process for preparing specific complete mixed polyol esters from [ unsymmetrically substituted ] partial polyol esters with substantially no ester group rearrangement comprising esterifying [ said ] *a* partial polyol [ esters ] *ester* with an acid anhydride in the presence of a catalytic amount of a member selected from the group consisting of perfluoroalkyl sulfonic acids and perfluoroalkyl sulfonic acid anhydrides, *said partial polyol ester being selected from the group consisting of partial polyol esters from aliphatic diols having the hydroxyl groups unsymmetrically substituted with respect to the carbon chain and partial polyol esters from aliphatic polyols containing at least three hydroxyl groups.*

2. A process according to claim 1 comprising admixing: (1) a polyol selected from the group consisting of aliphatic diols wherein the hydroxyl groups are unsymmetrically substituted with respect to the carbon chain and aliphatic polyols containing at least three hydroxyl groups, said polyols having been partially esterified with a monocarboxylic acid containing about 8 to 22 carbon atoms, with (2) a member selected from the group consisting of acidic lipid anhydrides of the structural formula

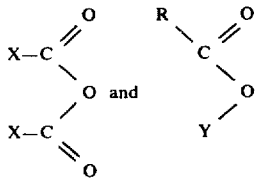

wherein

X is a substituent selected from the group consisting of:

(i) alkyl and alkenyl groups containing from 7 to 21 carbon atoms and having the formula R—

(ii) residues of alkyl half-esters of a dicarboxylic acid having the formula

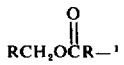

(iii) residues of monoacyl diol half-esters of a dicarboxylic acid having the formula

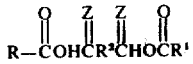

(iv) residues of diacyl glyceride half-esters of a dicarboxylic acid having the formula

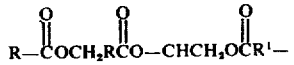

and (v) residues of monoacyl derivatives of a primary monohydroxy monocarboxylic acid having the formula

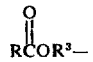

wherein in (i)–(v) above:

R is an alkyl or alkenyl group containing 7 to 21 carbon atoms;

$R^1$ is an alkylene group containing 2 to 4 carbon atoms;

$R^2$ is an alkylene group containing 0 to 4 carbon atoms;

$R^3$ is an alkylene group containing 2 to 5 carbon atoms;

Z is a substitutent selected from the group of hydrogen and methyl; and

Y is a substituent selected from the group consisting of benzyl, p-nitrobenzyl, and phosphoryl ester; and (3) a catalyst selected from the group consisting of perfluoroalkyl sulfonic acids and perfluoroalkyl sulfonic acid anhydrides, at a molar ratio of said catalyst to acidic lipid anhydride of at least about 0.01 to 1.

3. The process of claim 1 which is carried out at a temperature from 0° F. to 212° F.

4. The process of claim 2 which is carried out using a molar excess of the acidic lipid anhydride.

5. The process of claim 1 wherein the partial polyol ester is a partial glyceride ester.

6. The process of claim 1 wherein the partial polyol ester is a 1,3-diglyceride.

7. The process of claim 1 wherein the partial polyol ester is a partial ester of 1,2-propylene glycol.

8. The process of claim 1 wherein the acid anhydride is symmetrical.

9. The process of claim 1 wherein the acid anhydride is an alkyl anhydride wherein the alkyl group contains from 7 to about 21 carbon atoms.

10. The process of claim 1 wherein the acid anhydride is oleic anhydride.

11. The process of claim 1 wherein the partial polyol ester is a monoglyceride and the reaction is carried out in an organic solvent selected from the group consisting of benzene and pyridine.

12. The process of claim 1 wherein the catalyst is a member selected from the group consisting of perfluoroalkyl sulfonic acids and perfluoroalkyl sulfonic acid anhydrides wherein the perfluoroalkyl substituent contains from 1 to about 18 carbon atoms.

13. The process of claim 1 wherein the catalyst is a ıember selected from the group consisting of tri-uoromethane sulfonic acid and trifluoromethane sul-ɔnic acid anhydride.

14. A process for preparing a synthetic cocoa butter omprising acylating the 2-hydroxyl group of 1-palmit-yl-3-stearoyl glycerol with oleic anhydride in the pres-nce of a catalyst selected from the group consisting of erfluoroalkyl sulfonic acids and perfluoroalkyl sul-ɔnic acid anhydrides, and crystallizing and separating ıe synthetic cocoa butter thus formed.

15. The process of claim 14 wherein the catalyst is a ıember selected from the group consisting of tri-uoromethane sulfonic acid and trifluoromethane sul-ɔnic acid anhydride.

16. A process for preparing synthetic cocoa butter omprising: (1) admixing substantially completely hy-rogenated palm oil with glycerol in the presence of ;iacetin and sodium methoxide catalyst; (2) separating and crystallizing the 1,3-diglycerides formed; (3) acyl-ating the 2-hydroxyl groups thereof with oleic anhy-dride in the presence of a catalyst selected from the group consisting of perfluoroalkyl sulfonic acids and perfluoroalkyl sulfonic acid anhydrides; and (4) crys-tallizing and separating the synthetic cocoa butter thus formed.

17. The process of claim 16 wherein the catalyst is a member selected from the group consisting of tri-fluoromethane sulfonic acid and trifluoromethane sul-fonic acid anhydride.

18. The process of claim 16 wherein the catalyst to oleic anhydride molar ratio is at least 0.01:1.

19. The process of claim 16 which is carried out at from about 0° F. to about 212° F.

20. The process of claim 16 which is carried out in the presence of a molar excess of oleic anhydride.

* * * * *